(12) United States Patent
Wang et al.

(10) Patent No.: US 12,530,085 B2
(45) Date of Patent: Jan. 20, 2026

(54) ELECTRONIC DEVICE

(71) Applicant: AAC Microtech (Changzhou) Co., Ltd., Changzhou (CN)

(72) Inventors: Changliang Wang, Changzhou (CN); Dong Lu, Changzhou (CN); Chao Wang, Changzhou (CN); Yulei Zhang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 18/986,564

(22) Filed: Dec. 18, 2024

(65) Prior Publication Data
US 2025/0390174 A1 Dec. 25, 2025

Related U.S. Application Data

(63) Continuation of application No. PCT/CN2024/100925, filed on Jun. 24, 2024.

(51) Int. Cl.
*G06F 3/01* (2006.01)
*G06F 3/02* (2006.01)
*H10N 30/20* (2023.01)

(52) U.S. Cl.
CPC ............ *G06F 3/016* (2013.01); *G06F 3/0202* (2013.01); *H10N 30/2041* (2023.02)

(58) Field of Classification Search
CPC .... G06F 3/016; G06F 3/0202; H10N 30/2041
See application file for complete search history.

(56) References Cited

U.S. PATENT DOCUMENTS

| | | | |
|---|---|---|---|
| 2017/0153703 A1* | 6/2017 | Yun | G06F 3/016 |
| 2020/0103968 A1* | 4/2020 | Amin-Shahidi | G06F 3/016 |
| 2025/0211229 A1* | 6/2025 | Archambault | H03K 17/005 |
| 2025/0240515 A1* | 7/2025 | Baker | H04N 23/631 |

* cited by examiner

*Primary Examiner* — Amit Chatly
(74) *Attorney, Agent, or Firm* — Wiersch Law Group

(57) ABSTRACT

The present application provides an electronic device, including a housing provided with a hole and a virtual button structure provided within the housing. A pressing member of the virtual button structure is accommodated within the housing and partially exposed out of the housing through the hole. The virtual button structure further includes a sensor, a spacer, a substrate, and a piezoelectric sheet stacked within the housing. The sensor is connected to the pressing member, the substrate is provided on a side of the sensor and forms a vibration gap with the sensor, and the spacer is provided within the vibration gap. The piezoelectric sheet is provided on a side of the substrate and configured to generate a vibration and transmit the vibration to the pressing member. The present application can improve the effect of button triggering feedback, realize the localized vibration of the buttons, and enhance the user's experience.

10 Claims, 3 Drawing Sheets

ELECTRONIC DEVICE

CROSS-REFERENCE TO RELATED APPLICATIONS

This application is a continuation of International Application No. PCT/CN2024/100925, Jun. 24, 2024, the entire contents of which is incorporated herein by reference.

TECHNICAL FIELD

The present application relates to the technical field of buttons, in particular to an electronic device.

BACKGROUND

With the rapid development of communication technology, the upgrade cycle for electronic products has become increasingly fast, and users' usage time and frequency of these products have significantly increased. In daily life, users not only have high expectations for the performance, power consumption, and storage capacity of electronic products, but they also have higher requirements for the buttons on these devices.

Current physical buttons mainly function through structures such as keys and dome switches, where the circuit is activated by pressing the dome switch, and the tactile sensation is achieved through the force feedback generated during the deformation of the dome switch. This results in relatively limited feedback effects, making it difficult for the buttons to provide specialized responses for specific scenarios that could offer users more direct and muscle-memory-friendly prompts and feedback. As a result, there is insufficient tactile feedback and a monotonous vibration response, which affects the user experience.

Therefore, it is necessary to provide a new button structure for electronic devices to solve the above technical problems.

SUMMARY

The purpose of the present application is to provide an electronic device capable of improving the tactile feedback effect, realizing a local vibration of a button, and enhancing a user experience.

In order to solve the above technical problem, the present application provides an electronic device comprising:
a housing provided with a hole; and
a virtual button structure provided within the housing, wherein a pressing member of the virtual button structure is accommodated within the housing and partially exposed out of the housing through the hole; the virtual button structure further comprises a sensor, a spacer, a substrate, and a piezoelectric sheet stacked within the housing;
the sensor is connected to the pressing member and configured to detect a pressing state of the pressing member;
the substrate is provided on a side of the sensor back away from the pressing member and forms a vibration gap with the sensor; the spacer is provided within the vibration gap, and opposite sides of the spacer are connected to the sensor and the substrate, respectively;
the piezoelectric sheet is provided on a side of the substrate back away from the spacer, and the piezoelectric sheet is configured to generate a vibration according to the pressing state of the pressing member and transmit the vibration to the pressing member.

In an embodiment, the virtual button structure further comprises a support sheet provided between the sensor and the spacer, which is configured to support the pressing member and the sensor.

In an embodiment, the support sheet is a metal support sheet, and a thickness of the support sheet is 0.1-1 mm.

In an embodiment, the virtual button structure further comprises a first stopper and a second stopper, which are provided within the vibration gap and fixed to the support sheet and/or the sensor; the first stopper and the second stopper are provided spaced apart from the spacer and provided on opposite sides of the spacer, respectively.

In an embodiment, the support sheet is of a rectangular structure, and the first stopper and the second stopper are provided on opposite sides of the spacer along a long-axis direction of the support sheet; an end of the first stopper away from the spacer is flush with an end portion of the support sheet, and an end of the second stopper away from the spacer is flush with the other end portion of the support sheet.

In an embodiment, the first stopper and the second stopper are both made of metal or polymer, and a thickness of the first stopper and a thickness of the second stopper are both less than a thickness of the spacer.

In an embodiment, the thickness of the first stopper and the thickness of the second stopper are 0.05-0.3 mm, and the thickness of the spacer is 0.1-0.5 mm.

In an embodiment, opposite ends of the substrate are provided with through-holes, and the housing is provided with fixing holes at positions corresponding to the through-holes; the electronic device further comprises a fixing member, which is sequentially arranged through the through-holes and the fixing holes to fix the substrate in an interior of the housing.

In an embodiment, the piezoelectric sheet comprises a plurality of piezoelectric ceramic sheets stacked along a pressing direction, and the piezoelectric ceramic sheet has a number of layers ranging from 3 to 20.

In an embodiment, the pressing member comprises a connecting portion accommodated in the housing and connected to the sensor and a pressing portion partially exposed out of the housing through the hole; an outer edge dimension of the pressing portion is smaller than an inner edge dimension of the hole, and an outer edge dimension of the connecting portion is larger than an inner edge dimension of the hole.

In an embodiment, projections of the pressing member, the sensor, and the support sheet on the substrate along a pressing direction overlap each other.

In an embodiment, a projection of the substrate on the piezoelectric sheet along a pressing direction overlaps an outer edge of the piezoelectric sheet.

In an embodiment, the substrate is a metal substrate and a thickness of the substrate is 0.05-0.5 mm.

The beneficial effect of the present application is that: the sensor is provided in the housing and connected to the pressing member in the present application to detect the pressing state of the pressing member. A substrate is provided on a side of the sensor back away from the pressing member, and a spacer is provided between the substrate and the sensor to provide a vibration space for the piezoelectric sheet. The piezoelectric sheet is provided on the side of the substrate back away from the spacer, and the piezoelectric sheet generates a corresponding vibration according to the pressing state detected by the sensor and transmits it to the user, effectively improving the feedback effect of the button triggering. Since the button can realize local vibration, it can be applied to different application scenarios, providing users with different tactile vibration sensations and effectively enhancing the user experience.

BRIEF DESCRIPTION OF THE DRAWINGS

In order to more clearly illustrate the technical solutions in the present application, the accompanying drawings to be used in the description of the embodiments will be briefly described below. Obviously, the accompanying drawings in the following description are only some embodiments of the present application, and other accompanying drawings may be obtained based on these drawings without creative labor.

DESCRIPTION OF THE REFERENCE SIGNS

1—housing; 10—hole; 11—fixing hole; 2—virtual button structure; 20—pressing member; 21—connecting portion; 22—pressing portion; 30—sensor; 40—support sheet; 50—spacer; 51—first stopper; 52—second stopper; 60—substrate; 61—through-hole; 70—piezoelectric sheet.

DETAILED DESCRIPTION OF THE EMBODIMENTS

The technical solutions in the present application will be clearly and completely described below in conjunction with the accompanying drawings in the present invention. Obviously, the described embodiments are only a part of embodiments of the present application, and not all of the embodiments. Based on the embodiments in the present application, all other embodiments obtained by a person skilled in the art without making creative labor fall within the scope of protection of the present application.

Figure 1:
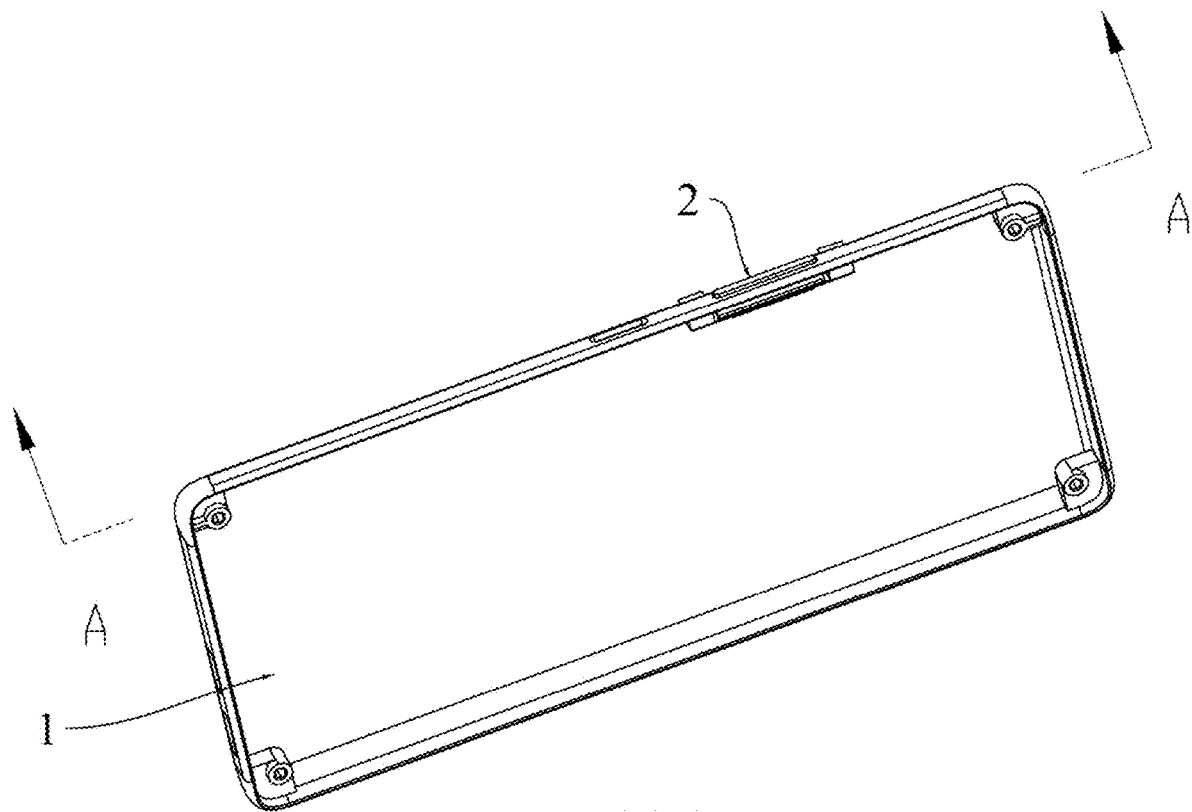
FIG. 1 shows a structural schematic diagram of an electronic device according to an embodiment of the present application.

As shown in FIGS. 1-6, embodiments of the present application provide a virtual button structure that can improve the effect of button triggering feedback, realize localized vibration of the key, and enhance the user experience. As shown in FIG. 1, there is a structural schematic diagram of an electronic device according to an embodiment of the present application. The electronic device provided by the present application includes a housing 1 and a virtual button structure 2 provided inside the housing 1.

Figure 5:
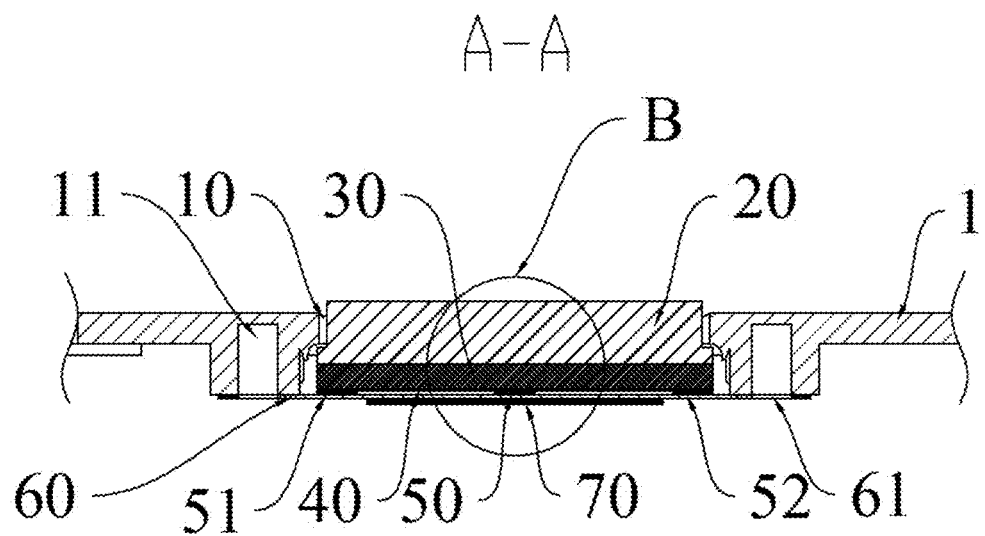
FIG. 5 shows a sectional view of the electronic device shown in FIG. 1 along the direction A-A.

As shown in FIG. 5, which is a sectional view of the electronic device shown in FIG. 1 along the direction A-A. The housing 1 provided by the present application is provided with a hole 10, and the virtual button structure 2 is provided with a pressing member 20. The pressing member 20 is accommodated in the interior of the housing 1 and is exposed out of the housing 1 through the hole 10. The pressing member 20 can be moved in a pressing direction with respect to the housing 1 by pressing a portion of the pressing member 20 that is exposed on the exterior of the housing 1.

Figure 2:
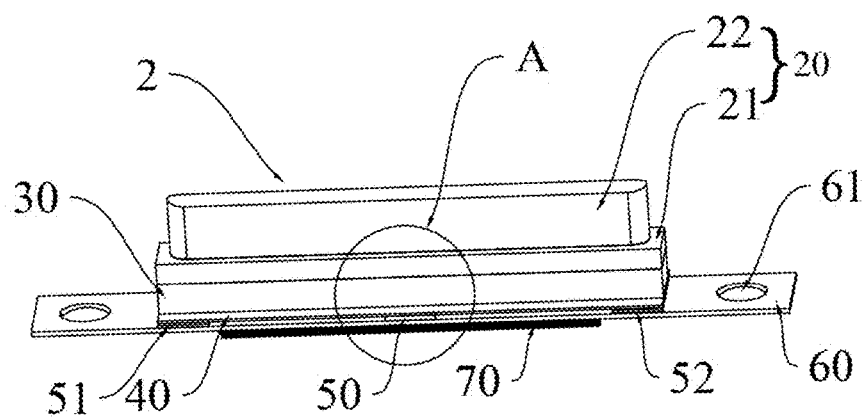
FIG. 2 shows a schematic diagram of a virtual button structure according to an embodiment of the present application.

Further, FIG. 2 is a schematic diagram of the virtual button structure 2 according to an embodiment of the present application, it can be observed that the virtual button structure 2 provided by the present application further includes a sensor 30, a spacer 50, a substrate 60, and a piezoelectric sheet 70 stacked within the housing 1 along the thickness direction.

Specifically, the sensor 30 is connected to the pressing member 20 and configured to detect the pressing state of the pressing member. The substrate 60 is provided on a side of the sensor 30 back away from the pressing member 20, and a vibration gap is formed between the substrate 60 and the sensor 30. In the present application, the spacer 50 is provided within the vibration gap, and opposite sides of the spacer 50 are connected to the sensor 30 and the substrate 60, respectively.

Further, the piezoelectric sheet 70 is provided on a side of the substrate 60 back away from the spacer 50, which is configured to generate a vibration according to the pressing state of the pressing member 20 and transmit the vibration to the pressing member 20.

In an embodiment, the above-described sensor 30 may be provided in the form of any one of resistive pressure sensors, piezoelectric sensors, capacitive pressure sensors, or discrete pressure sensors, as long as it is capable of detecting the pressing state of the pressing member 20 any form of pressure sensor selected is feasible, and the present application does not impose any further limitations thereon.

In the embodiment of the present application, the sensor 30 can detect whether the pressing member 20 is in the state of being pressed at the current moment, and also collect the pressing time and the strength size according to the actual demand, in order to make different feedbacks for different pressing times and strength sizes, thereby improving the user's experience of use.

As an embodiment, the sensor 30 may be connected to the pressing member 20 by means of glue bonding or welding, so that when the user presses the pressing member 20, it will further act on the sensor 30 through the pressing member 20, and then the sensor 30 detects the pressing state of the pressing member 20 at the current moment.

Figure 3:
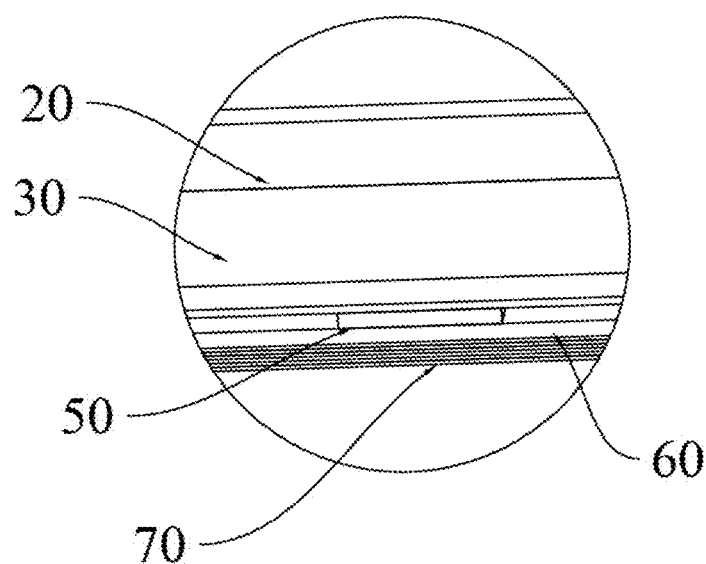
FIG. 3 shows an enlarged view of part A of the virtual button structure shown in FIG. 2.

As shown in FIG. 3, which is an enlarged view of part A of the virtual button structure shown in FIG. 2. In the present application, the substrate 60 is provided on the side of the sensor 30 back away from the pressing member 20. By erecting the substrate 60 on the inside of the housing 1 and forming a vibration gap between the substrate 60 and the sensor 30, a vibration space is provided for the piezoelectric sheet 70 provided at the bottom of the substrate 60.

Further, in the present application, the spacer 50 is provided in the above vibration gap, and the opposite sides of the spacer 50 are connected to the sensor 30 and the substrate 60, respectively. The piezoelectric sheet 70 is provided on a side of the substrate 60 back away from the spacer 50, which is configured to vibrate according to the pressing state of the pressed member 20 collected by the sensor 30. The piezoelectric sheet 70 contains a number of piezoelectric ceramic sheets stacked along the thickness direction, and the piezoelectric ceramic sheet is a kind of electronic component capable of converting mechanical energy and electrical energy into each other. Thus, when the voltage is applied to the piezoelectric ceramic sheet, it is possible to make use of the inverse piezoelectric effect of the piezoelectric ceramic sheet to make the piezoelectric ceramic sheet to produce a high-frequency vibration. Besides, in the present application, a vibration gap is provided between the substrate plate 60 and the sensor 30, and there is a spacer 50 provided in the vibration gap, so that it will be possible to transmit the vibration of the piezoelectric sheet 70 through the spacer 50 as well as the piezoelectric sensor 30 to the pressing member 20, thereby providing tactile feedback to the user.

Further, when a vibration gap is formed between the sensor 30 directly and the substrate 60 at the bottom, the spacer 50 may be provided in the vibration gap. In this circumstance, the opposite sides of the spacer 50 are respectively connected to the sensor 30 and the substrate 60, respectively. The spacer 50 and the substrate 60 may be connected by means of glue bonding or welding. The spacer 50 may be provided in the form of a metal material, and the thickness of the spacer 50 may be set to 0.1-0.5 mm.

As an embodiment, the electronic device of the present application is also provided with a support sheet 40 between the sensor 30 and the spacer 50, in order to avoid the user pressing with too much force directly on the substrate 60, which may cause damage to the substrate 60 as well as to the piezoelectric sheet 70 connected to the substrate 60. In the present application, the support sheet 40 is provided to support the sensor 30 and the pressing member 20, which can effectively cushion as well as support the pressing action of the pressing member 20.

The support sheet 40 may be connected to the sensor 30 by means of gluing or welding. In this circumstance, the vibration gap is formed between the support sheet 40 and the substrate 60, and the opposite sides of the spacer 50 are connected to the support sheet 40 and the substrate 60, respectively, thereby providing sufficient vibration space for the piezoelectric sheet 70. The thickness of the support sheet 40 may be set to be 0.1-1 mm, and the support sheet 40 may be set as a metal support sheet.

Further, it can be observed that the sensor 30, the support sheet 40, the spacer 50, and the substrate 60 provided by the present application are all provided as a rectangular structure and are stacked along the pressing direction of the pressing member 20. The spacer 50 may be set relatively in the middle of the support sheet 40 and the substrate 60, so as to avoid the user from damaging the substrate 60 or the piezoelectric sheet 70 due to the overly large amount of force during the pressing process, which may lead to plastic deformation of the substrate 60 and cause the substrate 60 to undergo plastic deformation.

As an embodiment, in the present application, a first stopper 51 and a second stopper 52 are provided within the vibration gap to provide a limit and a certain cushion for the pressing action of the pressing member 20.

Specifically, in the present application, the first stopper 51 and the second stopper 52 are provided within the vibration gap, and the first stopper 51 and the second stopper 52 may be fixed to the support sheet 40, or the first stopper 51 and the second stopper 52 may be fixed to the sensor 30.

Specifically, when the sensor 30 is in direct contact with the spacer 50, the first stopper 51 and the second stopper 52 are fixed to the sensor 30. When the support sheet 40 is provided between the sensor 30 and the spacer 50, the first stopper 51 and the second stopper 52 may be fixed to the support sheet 40. All of the above fixing methods of the first stopper 51 and the second stopper 52 are feasible, and the present application does not make any further limitations.

Further, the first stopper 51 and the second stopper 52 need to be spaced apart from the spacer 50 and provided on opposite sides of the spacer 50, respectively. It can be observed that the support sheet 40 provided by the present application is of a rectangular structure, and the first stopper 51 and the second stopper 52 are provided in a long-axis direction of the support sheet 40.

As an embodiment, the first stopper 51 and the second stopper 52 provided by the present application are provided on opposite sides of the spacer 50 along the long-axis direction of the support sheet 40. It can be observed that the end of the first stopper 51 away from the spacer 50 is flush with one end portion of the support sheet 40, and the end of the second stopper 52 away from the spacer 50 is flush with the other end portion of the support sheet 40. Correspondingly, as shown in FIG. 2, the first stopper 51 and the second stopper 52 are provided opposite each other on the left and right sides of the spacer 50, and the end of the first stopper 51 and the end of the second stopper 52 are flush with the end portions of the corresponding two ends of the support sheet 40. Thus, when the pressing member 20 is pressed downwardly, the left and right ends of the support sheet 40 are brought into contact with the first stopper 51 and the second stopper 52, so as to avoid damage to the substrate 60 as well as the piezoelectric sheet 70 caused by excessive pressing force.

Since the end portions of the left and right sides of the support sheet 40 are flush with the first stopper 51 and the second stopper 52 at the corresponding positions, it can also be understood that a projection of the support sheet 40 on the substrate 60 along the pressing direction covers the first stopper 51, the spacer 50, and the second stopper 52.

Further, the first stopper 51 and the second stopper 52 may be provided on the substrate 60 by means of gluing or welding, and the thickness of the first stopper 51 and the thickness of the second stopper 52 should be less than the thickness of the spacer 50, so as to avoid that when the thickness of the first stopper 51 and the second stopper 52 exceeds the thickness of the spacer 50, the force generated during pressing is concentrated on the spacer 50, which results in a hidden crack in the substrate 60 or the piezoelectric sheet 70. Therefore, it is necessary to set the thickness of the first stopper 51 and the second stopper 52 to be less than the thickness of the spacer 50, so as to provide a limiting effect for the left and right ends of the support sheet 40 when pressed.

In an embodiment, on the premise of satisfying that the thicknesses of the first stopper 51 and the second stopper 52 are less than the thickness of the gasket 50, the thicknesses of the first stopper 51 and the second stopper 52 are satisfied between 0.05-0.3 mm, and the thickness of the gasket 50 is set between 0.1-0.5 mm.

As an embodiment, the material of the first stopper 51 and the material of second stopper 52 may be a metal or polymer material.

In the embodiment of the present application, the first stopper 51 and the second stopper 52 may be set to have dimensions similar to the dimensions of the spacer 50. In principle, the first stopper 51, the second stopper 52, and the spacer 50 may be set to have the same dimensions and be symmetrically set on the substrate 60, and the end of the first stopper 51 and the end of the second stopper 52 should be flush with the end portions of left and right sides of the support sheet 40, respectively.

As an embodiment, the substrate 60 may be fixed inside the housing 1 by means of a fixing member (not shown in the figure). As shown in FIG. 2, it can be observed that the length of the substrate 60 is greater than the length of the sensor 30. In the present application, opposite ends of the substrate 60 are both provided with a through-hole 61, and fixing holes 11 are provided at positions of the housing 1 corresponding to the through-holes 61, and the two through-holes 61 are relatively exposed to the exterior of the virtual button structure 2

Figure 4:
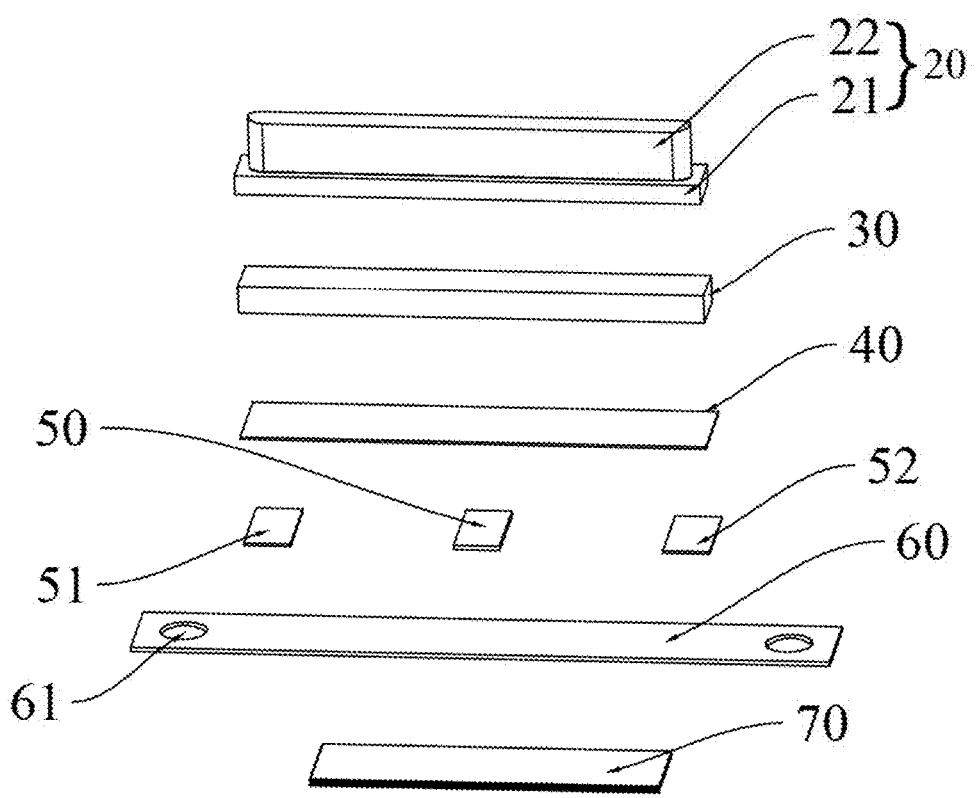
FIG. 4 shows an exploded view of the virtual button structure shown in FIG. 2.

As shown in FIG. 4, which is an exploded view of the virtual button structure shown in FIG. 2, the electronic device provided by the present application further includes the above-described fixing member. The fixing member is provided in the fixing hole 11, and the fixing member is arranged through the through-hole 61 and the fixing hole 11 in turn, thereby fixing the substrate 60 in the interior of the housing 1. Further, the piezoelectric sheet 70 provided on the lower side of the substrate 60 and the sensor 30, the support sheet 40, and other structures provided on the upper side of the substrate 60 are fixed in the interior of the housing 1, so as to form a suspension structure capable of vibrating in the pressing direction in the interior of the housing 1.

It should be noted that in the present invention, although the substrate 60 is fixed inside the housing 1 by means of a fixing member, a gap is formed between the pressing member 20, the sensor 30, the support sheet 40, the first stopper 51, the second stopper 52, and the piezoelectric sheet 70 and the side wall of the housing 1, and thus does not affect the pressing action of the pressing member 20 inside the housing 1 and the vibration feedback from the piezoelectric sheet 70 in response to the pressing action.

As an example, the substrate 60 may be bolted to the interior of the housing 1, or the two sides of the substrate 60 may be made into a snap structure to be attached to the interior of the housing 1, as long as it is feasible to realize the substrate 60 to be attached to the interior of the housing 1.

As an embodiment, the thickness of the substrate 60 may be between 0.05-0.5 mm, and the substrate 60 may be set in the form of a metal substrate, such as the substrate 60 made of stainless steel, or the substrate 60 made of beryllium bronze. The metal materials of the above examples are feasible, and the present application does not impose further limitations thereon.

Further, the piezoelectric sheet 70 provided by the present application is a piezoelectric stacked structure, and the piezoelectric sheet 70 includes a plurality of piezoelectric ceramic sheets stacked along a first direction. It can also be understood as piezoelectric ceramic sheets are stacked along the thickness direction. In a specific embodiment provided by the present application, the above pressing direction is the extension direction from the pressing member 20 toward the piezoelectric sheet 70, and the number of layers of the piezoelectric ceramic sheet may be set as 3 to 20 layers, so as to provide feedback of different intensities to the pressing action of the user.

The piezoelectric sheet 70 may be set on the side of the substrate 60 away from the spacer 50 by means of gluing or welding, and the size of the piezoelectric sheet 70 is set smaller than the size of the substrate 60.

Since the piezoelectric ceramic sheet is a ceramic material capable of generating charge distribution or mechanical strain according to the pressure applied to its surface or electric field, when a voltage is applied to the piezoelectric ceramic sheet, the inverse piezoelectric effect of the piezoelectric ceramic sheet can be utilized to cause it to generate a high-frequency vibration. In the present invention, the sensor 30 detects the pressing state of the pressing member 20 at the current moment, and applies a corresponding voltage to the piezoelectric sheet 70 to generate a corresponding vibration, so as to provide feedback to the user's current pressing action. Since the piezoelectric sheet 70, the spacer 50, the support sheet 40, the sensor 30, and the pressing member 20 are suspended inside the housing 1, it is possible to concentrate the tactile effect generated by the vibration in the pressing portion 22, so that the vibratory sensation is concentrated and feedback to the user's hand.

Of course, it is also possible to apply different sizes of voltages to the piezoelectric sheet 70 according to the current pressing time and the pressing force detected by the sensor 30, so that the piezoelectric sheet 70 produces vibrations of different frequencies, thereby producing different vibration effects to further improve the user's experience, and the above embodiments are all feasible.

Further, the pressing member 20 provided by the present application can be understood as a button that is pressed by the user during the pressing process. The pressing member includes a connecting portion 21 accommodated in the interior of the housing 1 and connected to the sensor 30, and a pressing portion 22 partially exposed out of the housing 1 through the hole 10. The pressing portion 22 is a position that is directly contacted by the user when the user performs pressing, and the connecting portion 21 is connected to the sensor 30 provided in the interior of the housing 1.

Further, since the housing 1 is provided with the hole 10, in the present application, the outer edge of the pressing portion 22 is set to be smaller than the inner edge of the hole 10, so as to realize that the pressing portion 22 is able to extend out of the housing 1 from the hole 10 and realize repeated pressing action at the hole 10. The outer edge of the connecting portion 21 is set to be larger than the inner edge of the hole 10, so as to avoid the pressing portion 22 as well as the connecting portion 21 as a whole coming off the exterior of the housing 1, which affects the feeling of use.

Figure 6:
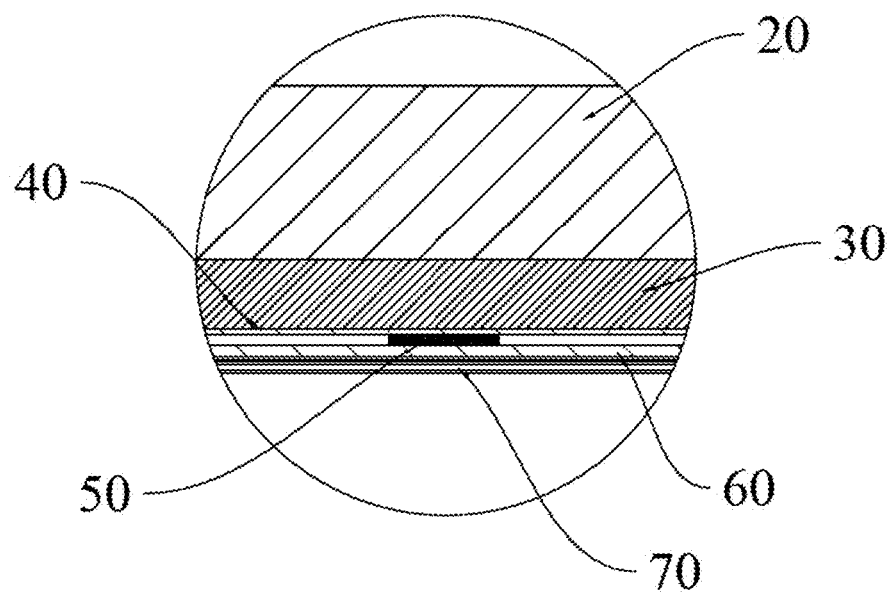
FIG. 6 shows an enlarged view of part B in the sectional view shown in FIG. 5.

As shown in FIG. 6, which is an enlarged view of part B in the sectional view shown in FIG. 5, it can be observed that the pressing member 20, the sensor 30, the support sheet 40, the spacer 50, the substrate 60, and the piezoelectric sheet 70 provided by the present application are stacked along the pressing direction, and the projections of the pressing member 20, the sensor 30, and the support sheet 40 on the substrate 60 along the pressing direction overlap with each other. That is, it can be understood as the pressing member 20, the sensor 30 and the support sheet 40 are of the same size and dimension.

Further, since the size of the substrate 60 is larger than the size of the sensor 30, the projection of the substrate 60 on the piezoelectric sheet 70 along the pressing direction covers the outer edge of the piezoelectric sheet 70, and the size of the sensor 30 is also larger than the size of the piezoelectric sheet 70, the projection of the sensor 30 on the piezoelectric sheet 70 along the pressing direction also completely covers the outer edge of the piezoelectric sheet 70, so that the vibration of the piezoelectric sheet 70 can be centralized feedback to the pressing member 20, thereby enhancing the user's experience.

It can be understood that the electronic device provided by the present application may be an intelligent electronic device that requires feedback by pressing buttons, such as a mobile phone, a watch, and a tablet computer, and the present application does not impose excessive limitations thereon.

The above-described embodiments are only used to illustrate the technical solution of the present application and are not a limitation thereof. Although the present application is described in detail with reference to the foregoing embodiments, a person of ordinary skill in the art should understand that it is still possible to modify the technical solution recorded in the foregoing embodiments or to replace some of the technical features equivalently. These modifications or substitutions do not detach the essence of the corresponding technical solutions from the spirit and scope of the technical solutions of the embodiments of the present application and shall be included in the scope of protection of the present application.

What is claimed is:

1. An electronic device comprising: a housing provided with a hole; and a virtual button structure provided within the housing, wherein a pressing member of the virtual button structure is accommodated within the housing and partially exposed out of the housing through the hole; the virtual button structure further comprises a sensor, a spacer, a substrate, and a piezoelectric sheet stacked within the housing; the sensor is connected to the pressing member and configured to detect a pressing state of the pressing member; the substrate is provided on a side of the sensor back away from the pressing member and forms a vibration gap with the sensor; the spacer is provided within the vibration gap, and opposite sides of the spacer are connected to the sensor and the substrate, respectively; the piezoelectric sheet is provided on a side of the substrate back away from the spacer, and the piezoelectric sheet is configured to generate a vibration according to the pressing state of the pressing member and transmit the vibration to the pressing member; wherein the virtual button structure further comprises a support sheet provided between the sensor and the spacer, which is configured to support the pressing member and the sensor; wherein the virtual button structure further comprises a first stopper and a second stopper, which are provided within the vibration gap and fixed to the support sheet and/or the sensor; the first stopper and the second stopper are provided spaced apart from the spacer and provided on opposite sides of the spacer, respectively; and wherein the support sheet is of rectangular structure, and the first stopper and the second stopper are provided on opposite sides of the spacer along a long-axis direction of the support sheet; an end of the first stopper away from the spacer is flush with an end portion of the support sheet, and an end of the second stopper away from the spacer is flush with the other end portion of the support sheet.

2. The electronic device of claim 1, wherein the support sheet is a metal support sheet, and a thickness of the support sheet is 0.1-1 mm.

3. The electronic device of claim 1, wherein the first stopper and the second stopper are both made of metal or polymer, and a thickness of the first stopper and a thickness of the second stopper are both less than a thickness of the spacer.

4. The electronic device of claim 3, wherein the thickness of the first stopper and the thickness of the second stopper are 0.05-0.3 mm, and the thickness of the spacer is 0.1-0.5 mm.

5. The electronic device of claim 1, wherein opposite ends of the substrate are provided with through-holes, and the housing is provided with fixing holes at positions corresponding to the through-holes; the electronic device further comprises a fixing member, which is sequentially arranged through the through-holes and the fixing holes to fix the substrate in an interior of the housing.

6. The electronic device of claim 1, wherein the piezoelectric sheet comprises a plurality of piezoelectric ceramic sheets stacked along a pressing direction, and the piezoelectric ceramic sheet has a number of layers ranging from 3 to 20.

7. The electronic device of claim 1, wherein the pressing member comprises a connecting portion accommodated in the housing and connected to the sensor and a pressing portion partially exposed out of the housing through the hole; an outer edge dimension of the pressing portion is smaller than an inner edge dimension of the hole, and an outer edge dimension of the connecting portion is larger than an inner edge dimension of the hole.

8. The electronic device of claim 1, wherein projections of the pressing member, the sensor, and the support sheet on the substrate along a pressing direction overlap each other.

9. The electronic device of claim 1, wherein a projection of the substrate on the piezoelectric sheet along a pressing direction overlaps an outer edge of the piezoelectric sheet.

10. The electronic device of claim 1, wherein the substrate is a metal substrate and a thickness of the substrate is 0.05-0.5 mm.

* * * * *